Nov. 30, 1926.  1,609,148
A. N. WILCOX ET AL
WHEEL
Filed April 12, 1921
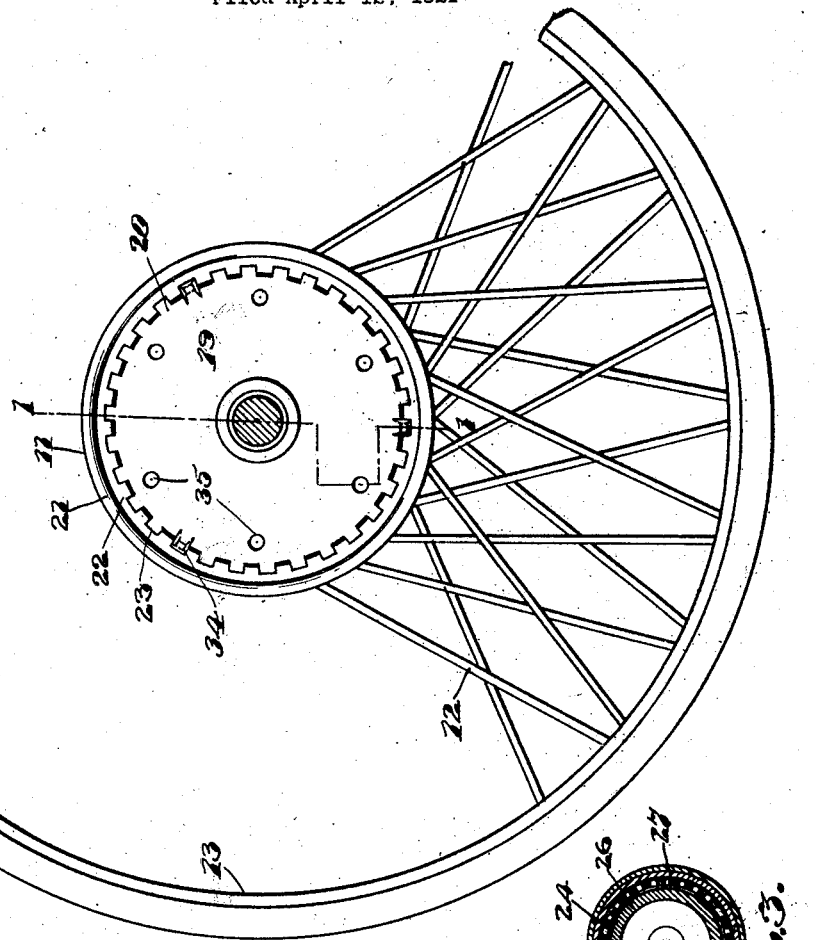
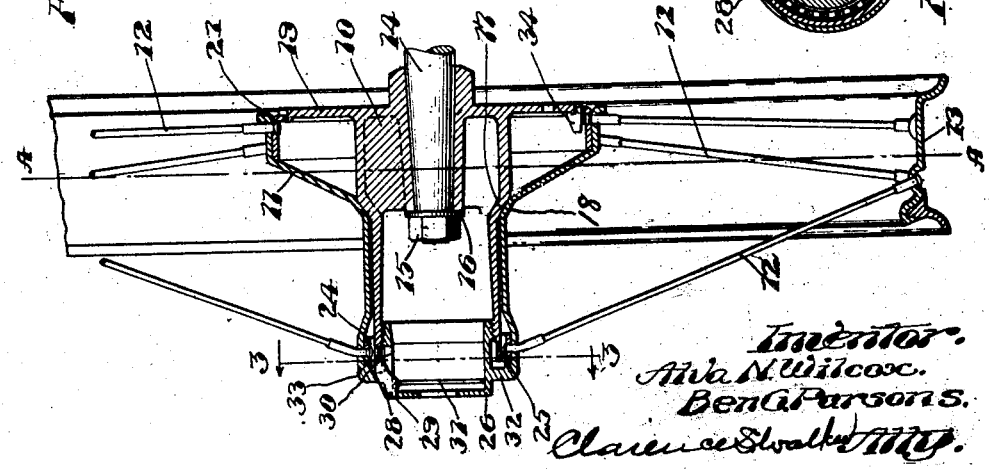
Inventor.
Alva N. Wilcox.
Ben G. Parsons.
Clarence E. Walker Patented Nov. 30, 1926.

1,609,148

UNITED STATES PATENT OFFICE.

ALVA N. WILCOX AND BEN G. PARSONS, OF DAYTON, OHIO, ASSIGNORS TO DAYTON WIRE WHEEL COMPANY, OF DAYTON, OHIO, A CORPORATION OF OHIO.

WHEEL.

Application filed April 12, 1921. Serial No. 460,750.

This invention relates to an improvement in wheels, particularly of the demountable type. This type comprises an inner hub which is suitably secured to the vehicle axle, a hub shell mounted on the inner hub and carrying the rim and a hub cap by which the hub shell is fixed in place on the hub.

One object of this invention is to provide means for transmitting motion between the hub shell and the inner hub, such means being located at the large inner end of the wheel.

Another object is to provide reinforcing rings at each end of the shell, the ring at the inner end coacting with a large flange on the inner hub.

A further object is to provide a hub cap for a wheel which engages internally the inner hub and the hub shell and which is positively fixed to the inner hub.

Other objects will appear from an examination of the specification and of the drawings which form a part thereof and in which Fig. 1 is a longitudinal section of one embodiment of this invention taken along the line 1—1 of Fig. 2;

Fig. 2 is a side elevation and

Fig. 3 is a section taken on the line 3—3 of Fig. 1.

This invention is shown applied to a wire spoked wheel but obviously it is not limited thereto since it does not depend upon the particular type of means used to connect the hub shell and the rim.

Referring to the drawings the reference numeral 10 is used to designate the inner hub on which is mounted the hub shell 11 carrying by means of the spokes 12 a rim 13. The assembled shell, spokes and rim are generally referred to as the wheel and this practice will be followed hereafter. The inner hub 10 is mounted on a rear axle 14 and held in place by any suitable means, a nut 15 and washer 16 being here disclosed.

Intermediate the ends of the inner hub is formed a conical portion 17 which is engaged by a similar conical portion 18 on the hub shell. As shown this is the only point where the shell rests directly on the inner hub. At the inner end of the hub is formed a circular flange 19 having on its periphery a series of equally spaced projections 20. A ring 21 is secured to the inside of the inner end of the hub shell and has a flange 22 provided with notches 23 which mesh with the projections 20 on the hub flange. Motion is thus transmitted between the inner hub 10 and the hub shell 11. By this construction motion is transmitted at the inner end of both the hub and the hub shell and entirely inside the central plane of the wheel designated by the line A—A. Furthermore in the type of lacing shown most of the drive is transmitted by the inner set of spokes which are adjacent the flange 22.

A ring 24 is fixed within the outer end of the hub shell. If a wheel having wire spokes is employed the spokes are preferably laced through the rings 21 and 24 so as to assist in securing the rings to the shell and also to provide a firm support for the spokes. In addition to the spokes 12 the rings are preferably riveted or welded to the shell, this practice being invariably followed if other than wire spokes are used.

The outer end of the inner hub is internally threaded at 25 to receive the externally threaded inner end of the hub cap 26, and has a series of notches 27 for the latch 28 pivoted at 29 in the hub cap. The latch 28 passes through a slot 30 in the hub cap and is normally held against the outer edge of the slot by a spring 31. On the hub cap 26 is a circular flange 32 whose periphery 33 is conically beveled toward the inner end of the cap. The outer ends of the hub shell 11 and the ring 24, which together receive the thrust of the hub cap, are correspondingly conically beveled so that the hub cap projects within the outer end of the hub shell. When, in assembling the wheel, the hub cap is tightened in the inner hub the hub shell is carried on the conical periphery 33 of the hub cap flange 32 and the conical portion 17 of the inner hub. It will also be noted that the hub cap engages both the inner hub and the hub shell internally.

In order to guide the wheel onto the inner hub outwardly extending fingers 34 are provided on certain of the projections 20, three being shown. The drawing discloses an inner hub formed for a rear axle. Such a hub ordinarily carries a brake drum and while one is not shown in the drawing the bolt holes 35 for such drum are disclosed.

Wheels of the type illustrated will fit on either a front or a rear inner hub, the outer contour of the hubs being the same, the only difference being in the form of the axle engaging portion.

While one embodiment only of this invention is shown and described, applicants are not to be limited thereby since it is obvious that other embodiments can be made without departing from the spirit and scope of the invention, as set forth in the following claims.

Having thus set forth our invention that which we claim as new and for which we desire the protection of United States Letters Patent is the following:

1. In a demountable wheel, an inner hub, a hub shell, having an enlarged inner end, a ring secured within said end and having a flange projecting downwardly at the inner end of said shell, a circular flange on and adjacent to the inner end of said inner hub, said flange being so located that when the shell is positioned on the hub, the periphery of the inner hub flange will join the periphery of said shell flange to close completely the inner end of the shell, means on said flanges adapted to intermesh and transmit motion between said inner hub and said shell, a conical portion on said shell intermediate its ends, a similar conical portion formed on said inner hub intermediate its ends adapted to be engaged by the conical portion on said shell and constituting the only point where said shell rests directly upon said inner hub, and a hub cap on the outer end of said inner hub bearing against the outer end of said shell to close the outer end thereof and entering the end of said shell to form with said conical portion on said inner hub spaced supporting means for said shell.

2. In a demountable wheel, an inner hub, a hub shell having an enlarged inner end, a ring secured within said end and having a flange downwardly projecting at the inner end of said shell, a circular flange on and adjacent to the inner end of said inner hub, the edges of both said flanges being toothed so that when the shell is assembled upon the inner hub said edges will intermesh, a plurality of guiding fingers mounted upon said inner hub flange in front of and forming continuations of certain of the raised parts of the toothed portion, said flanges being inside the center line of the wheel, a conical surface on said inner hub outside said center line on which a suitably formed conical surface on said shell rests, a ring at the outer end of said shell, the outer face of said shell and said ring being conically beveled and a hub cap having a similarly coned surface which bears against said outer face.

3. In a demountable wheel, an inner hub, a hub shell, the inner and outer ends of which are both enlarged, a ring secured within the enlarged inner end of said hub shell and having a downwardly projecting flange, a circular flange carried by and adjacent to the inner end of said inner hub, the edges of both said flanges being toothed so that when the shell is assembled upon the inner hub said edges will intermesh, a plurality of guiding fingers mounted upon said hub flange in front of and forming a continuation of certain of the raised parts of the toothed portion, both said flanges being inside the center line of the wheel, a conical surface on said inner hub outside the center line on which a suitably formed conical surface on said shell rests, a ring secured within the enlarged outer end of said hub shell the outer face of said shell and said ring being conically bevelled and a hub cap having a similarly coned surface which bears against said outer face and which extends into the outer end of said inner hub and has threaded engagement therewith.

In testimony whereof, we affix our signatures.

ALVA N. WILCOX.
BEN G. PARSONS.